(12) United States Patent
Jobs

(10) Patent No.: US 6,215,747 B1
(45) Date of Patent: *Apr. 10, 2001

(54) METHOD AND SYSTEM FOR INCREASING THE PERFORMANCE OF CONSTANT ANGULAR VELOCITY CD-ROM DRIVES

(75) Inventor: Jeffrey R. Jobs, Blaine, MN (US)

(73) Assignee: Micron Electronics, Inc., Nampa, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,372

(22) Filed: Nov. 17, 1997

(51) Int. Cl.⁷ ........................................ G11B 3/09
(52) U.S. Cl. ........................... 369/53.24; 369/53.2
(58) Field of Search ............................. 369/58, 54, 47, 369/48, 32, 13, 50

(56) References Cited

U.S. PATENT DOCUMENTS

| | | | |
|---|---|---|---|
| 4,789,975 | * 12/1988 | Taniyama | 369/50 |
| 4,827,462 | * 5/1989 | Flannagan et al. | 369/32 |
| 5,136,560 | * 8/1992 | Hangai et al. | 369/32 |
| 5,422,871 | * 6/1995 | Nakashima et al. | 369/58 |
| 5,434,838 | * 7/1995 | Haneda | 369/58 |
| 5,568,467 | * 10/1996 | Inagaki et al. | 369/48 |
| 5,596,564 | * 1/1997 | Fukushima et al. | 369/48 |

\* cited by examiner

*Primary Examiner*—Thang V. Tran
(74) *Attorney, Agent, or Firm*—Dorsey & Whitney LLP

(57) ABSTRACT

A method and system for increasing data retrieval rates for constant angular velocity and hybrid constant linear velocity/constant angular velocity CD-ROM drives. The data stored on CD-ROMs is normally placed starting with the innermost tracks and proceeding outward to the edge of the disk. Any unused or spare capacity occurs as an unused band at the outer edge of the disk. Because access times for files greater than a certain threshold size decrease with increasing radius at which the files are located on a CD-ROM for constant angular velocity and hybrid constant linear velocity/constant angular velocity CD-ROM drives, placing data files at the outer portions of the CD-ROM and leaving unused spare capacity towards the center of the CD-ROM will give better data retrieval rates when the CD-ROM is read in constant angular velocity or hybrid constant linear velocity/constant angular velocity CD-ROM drives.

25 Claims, 13 Drawing Sheets

(15 revolutions/sec) r = V

METHOD AND SYSTEM FOR INCREASING THE PERFORMANCE OF CONSTANT ANGULAR VELOCITY CD-ROM DRIVES

TECHNICAL FIELD

The present invention relates to the organization of data stored on CD-ROMs and, in particular, a method for organizing data on CD-ROMs that increases data retrieval efficiency in constant angular velocity CD-ROM drives.

BACKGROUND OF THE INVENTION

CD-ROM technology was first developed in 1976 and became, by the early 1980s, a widely accepted media for the distribution of recorded music. The potential application of CD-ROM technology for high capacity, low cost data storage and data distribution for computer systems was quickly recognized. CD-ROMs have since become the standard media for distribution of computer software.

FIG. 1 displays basic physical characteristics of a CD-ROM. A CD-ROM 101 is a transparent polycarbonate disk with a radius of 6 cm 102. At the center of the disk is a spindle hole 103 with a radius of 7.5 millimeters. A manufacturer stores data on a CD-ROM by impressing a pattern of flat areas, called lands, and depressions, called pits, onto the surface of the CD-ROM. The surface is then covered with a reflective metallized film, followed by a protective coat of lacquer. Data is read from the CD-ROM by shining a laser beam onto a rotating CD-ROM. Light from the laser beam is reflected by the lands and dispersed by the pits. The light reflected from the lands is detected by a photodiode detector. The lands and pits are arranged along a single spiral track 104 starting near the center of the disk and spiraling out to the edge of the disk. The single spiral track is approximately 4,500 meters in length and 600 nanometers wide. The adjacent turns of the spiral are about 1.6 microns apart.

FIGS. 2A and 2B display the low-level data formatting of a CD-ROM. The single spiral track of the CD-ROM is divided into data sectors. A standard size CD-ROM that stores 60-minutes of recorded music contains 270,000 data sectors. If the outer 5 millimeters of the disk is used for data storage, the resulting CD-ROM that stores 74 minutes of recorded music contains a total of 333,000 data sectors. The data sectors are arranged sequentially along the spiral track 201 from a starting point near the center of the disk outward towards the edge of the disk. Each sector 202 contains 12 bytes of synchronization information 203, followed by four bytes of header information 204, followed by 2,048 bytes of data 205, with the final 288 bytes used for error correcting codes 206.

FIG. 3 displays the read operation of a CD-ROM drive. The laser beam and photodiode detector are mounted on an assembly 301 that moves along a radial vector 302 of the CD-ROM. The CD-ROM is spun in a clockwise direction 303 by a motor. As the CD-ROM is spun, the photodetector/laser assembly moves radially outwards in order to sequentially access each successive sector arranged along the spiral track. In order to read a set of contiguous sectors starting at some arbitrary point on the surface of the CD-ROM, the photodiode/laser assembly is first moved outward to the approximate radius of the CD-ROM corresponding to the first sector of the set of contiguous sectors. This first operation is called seeking. Then each of the contiguous sectors is read in order as the photodiode/laser assembly follows along the track of the spinning disk outward from that point. This latter process is called data transfer. The total time required to read a number of contiguous sectors from a CD-ROM is called the access time, expressed by the following equation:

$$\text{access time} = \text{seek time} + \text{data transfer time} \quad (1)$$

FIG. 4 displays the higher-level formatting of the data on a CD-ROM. A CD-ROM contains three data sections. The first is a label section 401 that contains a volume title for the CD-ROM. The second section contains directory information that indicates to the software controlling the CD-ROM drive how the remaining data is laid out on the CD-ROM. The format of the directory information may vary depending on the operating system of the computer accessing the CD-ROM. Directories are usually logically ordered as tree-structured hierarchies. Following the directory information are the data files 403. The data files are analogous to data files traditionally stored on magnetic disks within computer systems. A data file contains a number of bytes of data, and may have further internal formatting, depending on the operating system of the computer for which the data file has been created. Each data file is stored on the CD-ROM in one or more contiguous data sectors. The label, directory and file data sections follow one another and are laid out from the starting point of the track near the center of the CD-ROM outward towards the edge of the CD-ROM. Any unused capacity of the CD-ROM occurs between the last used sector of the CD-ROM and the outer edge of the CD-ROM, forming a band of unused sectors at the outer edge of the CD-ROM.

FIG. 5 displays a polar-coordinate-based mathematical representation of a spinning CD-ROM. A location P 501 on the surface of the CD-ROM is designated by the length r of the radial vector 502 from the center of the CD-ROM to the location P and by the angle θ 503 by which radial vector is displaced from an arbitrary reference vector 504. The length of the arc S 505 corresponds to the length of the spiral track from the reference vector 504 to the point P 501. The length of this arc is approximately described by the following equation:

$$S = \theta r \quad (2)$$

Differentiating both sides of the above equation with respect to time produces the following equation:

$$dS/dt = d\theta/dt \; r \quad (3)$$

The rate of change of the length of the arc S with respect to time, dS/dt, represents the linear velocity of the point P along a track of the spinning CD-ROM. The rate of change of the angle θ with respect to time, dθ/dt, represents the angular velocity of the spinning CD-ROM. Thus, the following formula represents the linear velocity of a point moving on a spinning CD-ROM, V, in terms of the angular velocity of the CD-ROM, ω, and the length of a radial vector describing the location of the point, r:

$$V = \omega r \quad (4)$$

The linear velocity of a point moving on a spinning CD-ROM is thus equal to the angular velocity of the CD-ROM disk times the length of the radial vector from the center of the CD-ROM disk to the point.

Lower-speed CD-ROM drives commonly have variable speed motors that spin the CD-ROM disk at different angular velocities in order to keep the linear velocity of points moving under the photodetector/laser assembly constant. The data transfer rate is obviously directly related to the linear velocity at which lands and pits move under the photodetector/laser assembly. In constant linear velocity ("CLV") CD-ROM drives, the data transfer rate is therefore constant over the entire spiral track of the CD-ROM.

FIG. 6 displays a graph of angular velocity versus radius for a CD-ROM read by a CLV CD-ROM drive. The vertical axis 601 of the graph represents the angular velocity. The horizontal axis 602 represents the length of the radial vector from the center of the CD-ROM to a particular data sector. The curve displayed in the graph shows how a CLV drive varies the angular velocity at which it spins a CD-ROM depending on the radius at which the photodetector/laser assembly is reading sectors from the spiral track. The values are given for a standard 150 KB/sec data transfer rate. The angular velocity varies from about 15 revolutions per second at a radius of 1 cm, 603, to about five revolutions per second at a radius of 6 cm, 604. Thus, a CLV drive spins the disk faster in order to access the innermost sectors of a CD-ROM and spins the CD-ROM slower in order to access the sectors at the outer edge of the CD-ROM. Referring to equation (1) shown above, it can be seen that, because the data transfer time is constant over the entire surface of the CD-ROM for a CLV drive, and because the seek time increases with increasing values of location of a data file, the access time for a file on the CD-ROM is directly proportional to the length of the radial vector describing the location of the file. Thus, files located towards the center of the CD-ROM disk can be accessed significantly faster than files located at the outer edges. It is for this reason that the data organization described in FIG. 4 was initially adopted for CD-ROMs. In this data organization, the frequently accessed directory data is located close to the center of the CD-ROM, where access times are smallest. Space capacity is located toward the outer edge of the CD-ROM, where access times are greatest.

The initial standard for CD-ROMs specifies a data transfer rate of 150 KB per second, or, in other words, the reading of 75 data sectors per second by CD-ROM drivers. In order to decrease access times, manufacturers have increased the data transfer rate of CD-ROM drives in multiples of this initial standard data transfer rate. High end CD-ROM drives are currently capable of transferring data at a maximum rate of 16 times the standard 150 KB per second rate. These are known as 16× drives. The previous maximum data transfer rate was 12 times the initial standard. Drives designed to transfer data at this previous maximum rate were known as 12× drives. 12× and slower drives were all CLV drives. However, as manufacturers have increased the angular velocity at which they spin CD-ROMs in CD-ROM drives in order to achieve 16× drives, they have begun to use constant angular velocity ("CAV") drives rather than CLV drives, at least for some outer portion of the CD-ROM. Hybrid CLV/CAV CD-ROM drives are CLV drives from the starting point of the track out to some radial distance and then switch to being CAV drives from that point outward to the edge of the disk. Manufacturers have gone to CAV and hybrid CLV/CAV drives because the acceleration forces incurred when seeking from one part of a rapidly-spinning disk to another while correspondingly changing the angular velocity in a CLV drive have become prohibitive at the higher rotation rate of 16× drivers.

As pointed out in the article "16× CD-ROM Drives: The Truth," PC Magazine, Jun. 24, 1997, p. 29, hereby incorporated by reference, the access times for CD-ROMs nominally rated at 16× may actually be significantly greater than access times for CD-ROM drives nominally rated at 12×. A need for a new formatting convention for CD-ROMs to be read in CAV and hybrid CAV/CLV CD-ROM drives has therefore been recognized.

SUMMARY OF THE INVENTION

An embodiment of the present invention provides a method and system for organizing data on a CD-ROM in order to increase the data retrieval rate from the CD-ROM by CAV CD-ROM drives and CAV/CLV hybrid CD-ROM drives. A CD-ROM has a center and an outer edge. Data is stored sequentially on the CD-ROM along a spiral track starting from near the center of the CD-ROM and proceeding outward toward the outer edge of the CD-ROM. The stored data comprises a number of units of volume label data, directory data, and file data. The CD-ROM has a fixed maximum number of units of data capacity and has spare capacity equal to the difference between the fixed maximum number of units of data capacity of the CD-ROM and the number of units of label data, directory data, and file data.

In a first embodiment, the volume label data and the directory data is stored along the spiral track in an outward direction starting near the center of the CD-ROM. The file data is stored on the CD-ROM along the spiral track in an outward direction starting at a position on the spiral track following the volume label data and the directory data and following a number of data units equal to the spare capacity of the CD-ROM. When the data stored on the CD-ROM is organized in this fashion, the volume label data and directory data form an inner band on the surface of the CD-ROM justified to the center of the CD-ROM and the file data forms a band on the surface of the CD-ROM justified to the outer edge of the CD-ROM. In an alternative embodiment of the invention, data is stored on the CD-ROM in a single band on the surface of the CD-ROM justified to the outer edge of the CD-ROM. In both embodiments of the invention, the spare capacity of the CD-ROM may be padded with blank data.

DETAILED DESCRIPTION OF THE INVENTION

An embodiment of the present invention provides a method and system for organizing data stored on a CAV CD-ROM drive in order to minimize access times for retrieving the data and correspondingly increase the efficiency of data retrieval. One method for minimizing data access times is to move the data files outward toward the outer edge of the CD-ROM, leaving the volume label and directory information in the inner portion of the CD-ROM. Another method for minimizing data access times is to move both the volume label and directory information, as well as the data files, outward toward the outer edge of the CD-ROM.

Currently, data is stored, starting with the innermost tracks of a CD-ROM, in a sequential center-to-edge fashion. For CLV drives, where the access time is linearly proportional to the radius at which data is stored, this data format gives good overall performance. However, for CAV or hybrid CLV/CAV drives, this data format produces suboptimal data retrieval efficiency.

In a CAV drive, the linear velocity of a point moving along a spinning CD-ROM increases from the center of the drive outward to the edge of the drive. The linear velocity at a particular radius of a CD-ROM is directly proportional to the data transfer rate that is achievable at that radius. The linear velocity at a particular radius can thus be expressed as a data transfer rate.

Figure 1:
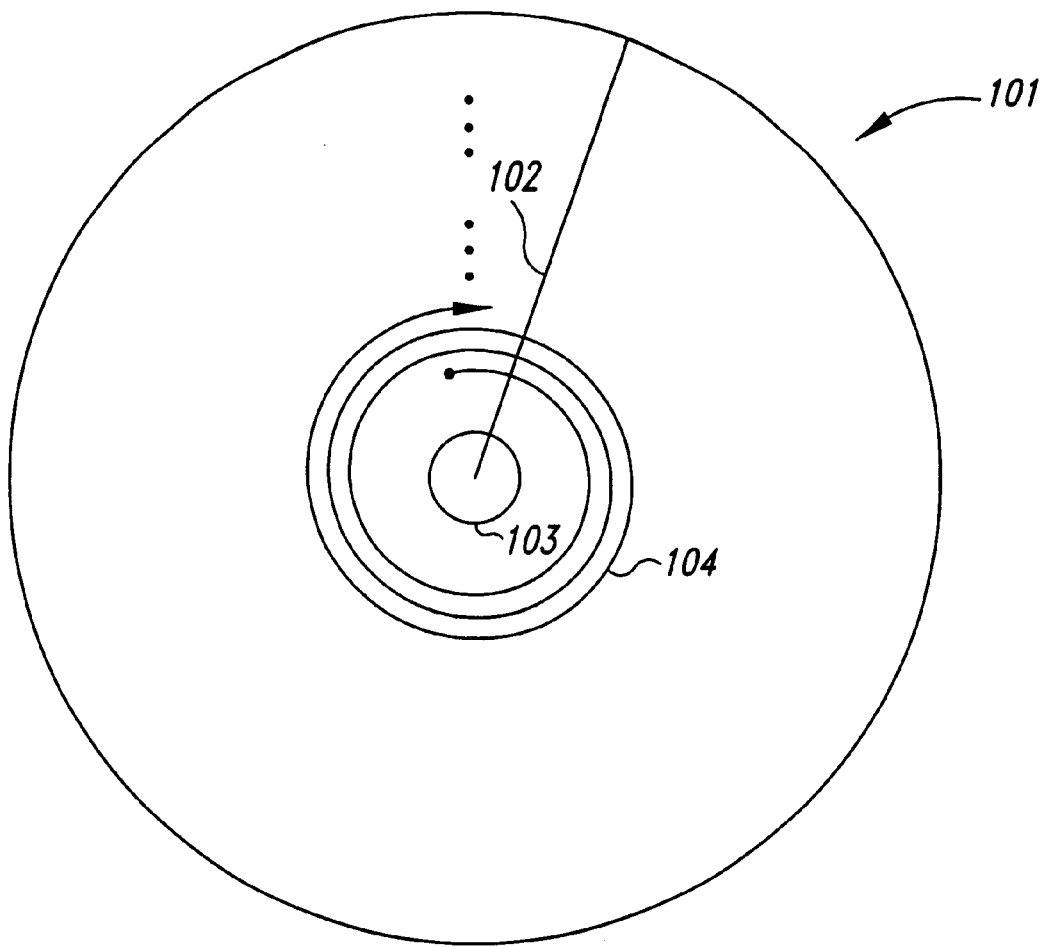
FIG. 1 displays physical characteristics of a CD-ROM.
Figure 2A:
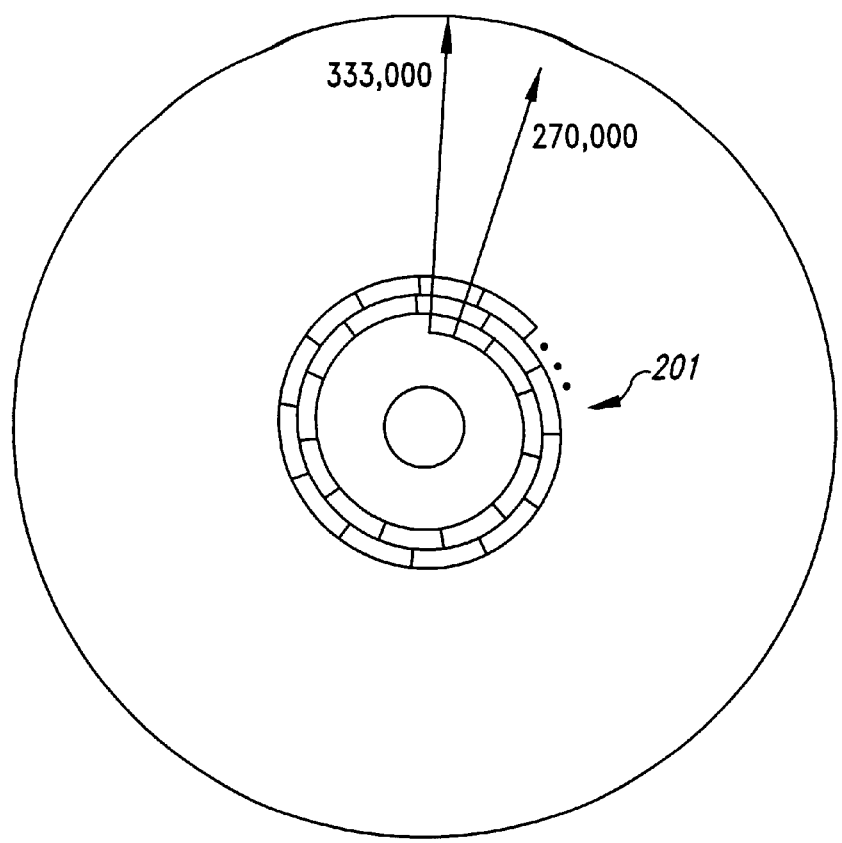
FIGS. 2A and 2B display the low-level formatting of a CD-ROM.
Figure 2B:
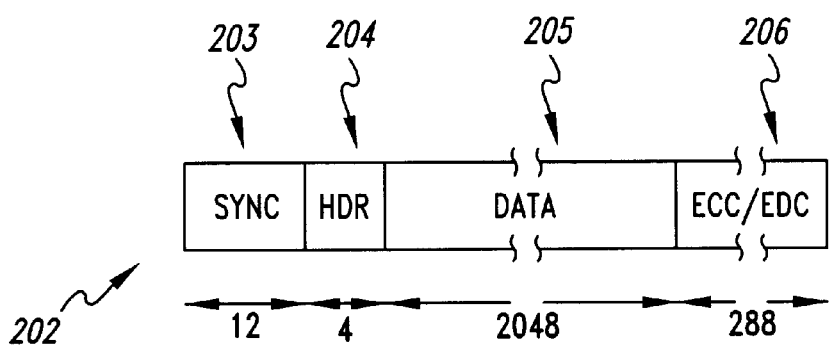
Figure 3:
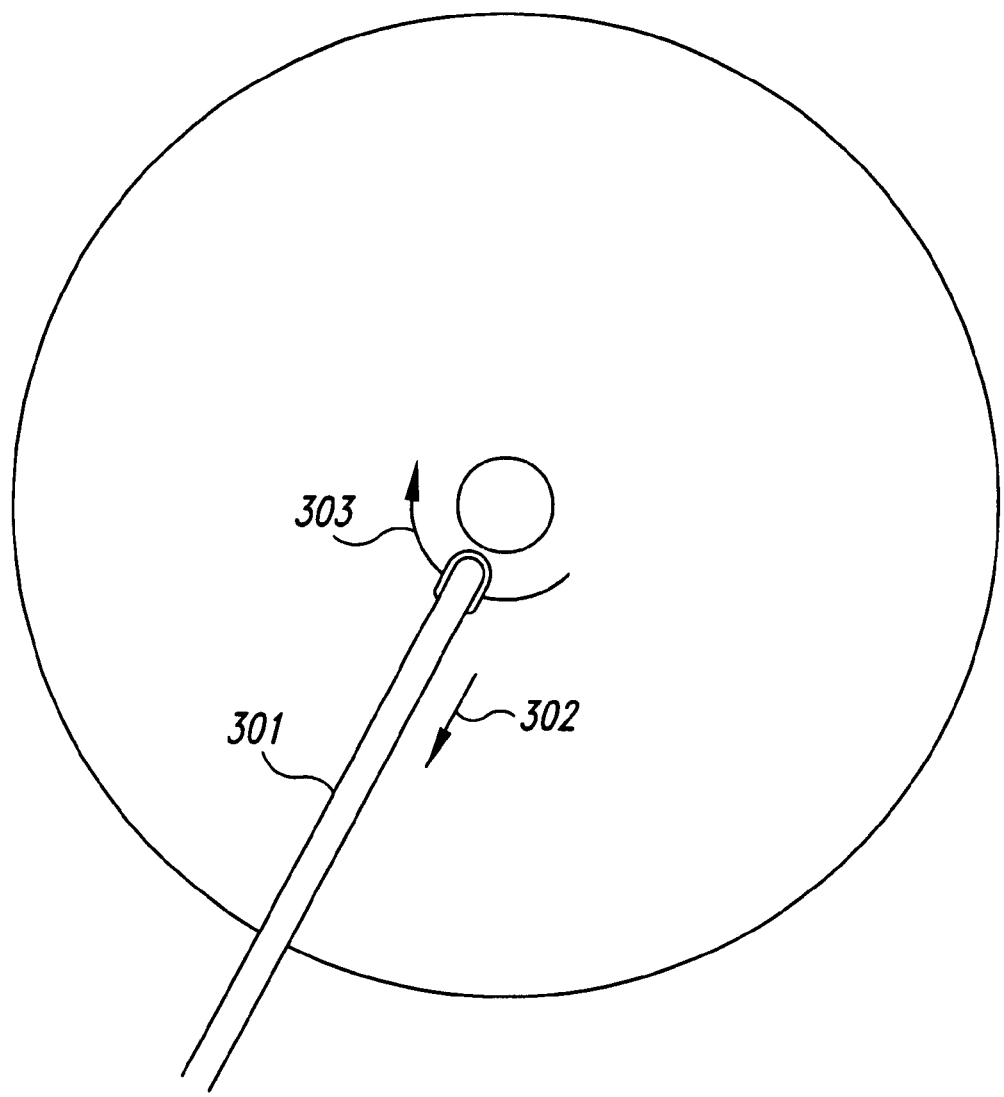
FIG. 3 displays the read operation of a CD-ROM drive.
Figure 4:
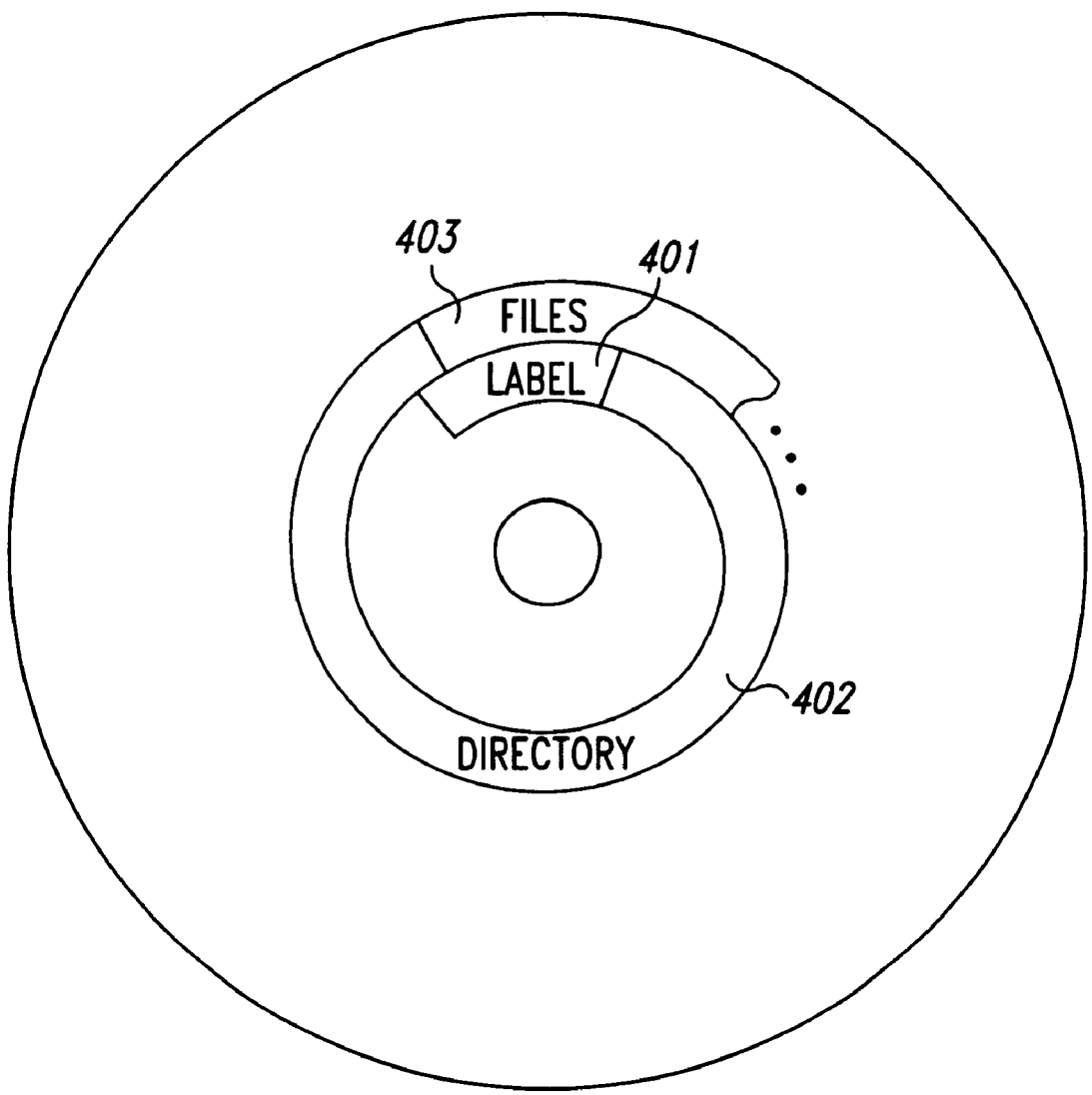
FIG. 4 displays the higher-level formatting of data on a CD-ROM.
Figure 5:
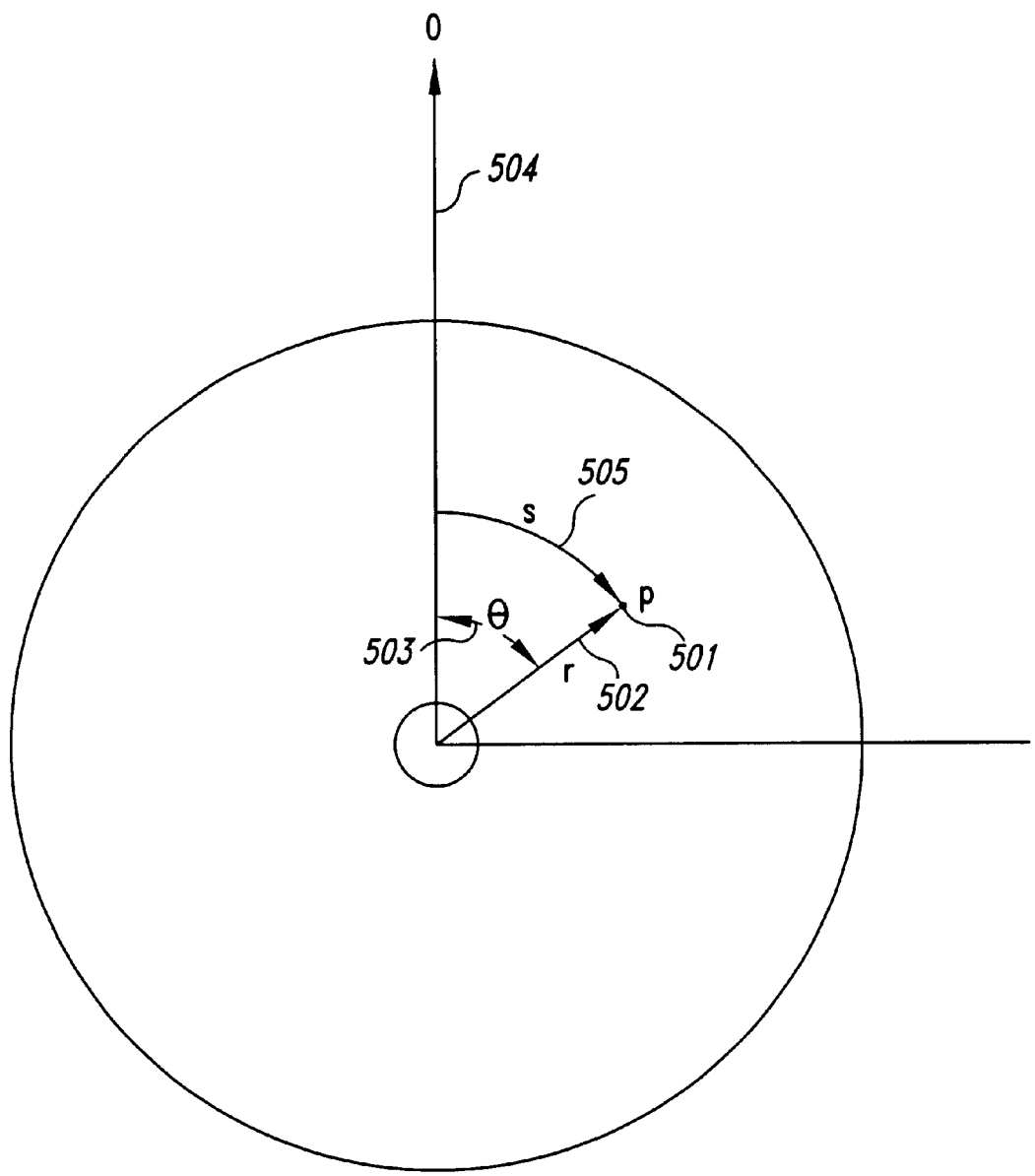
FIG. 5 displays a polar-coordinate-based mathematical representation of a spinning CD-ROM.
Figure 6:
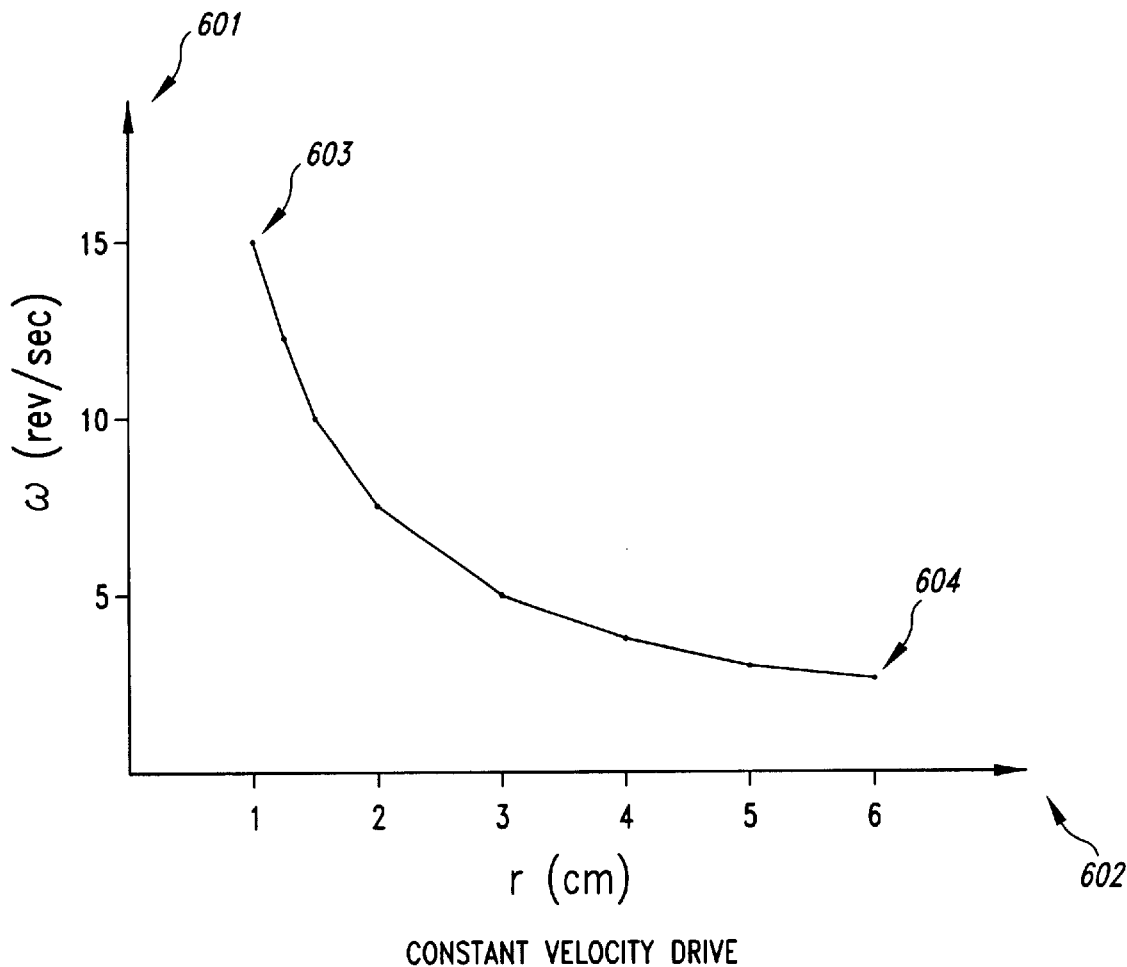
FIG. 6 displays a graph of angular velocity versus radius for a CD-ROM read by a CLV CD-ROM drive.
Figure 7:
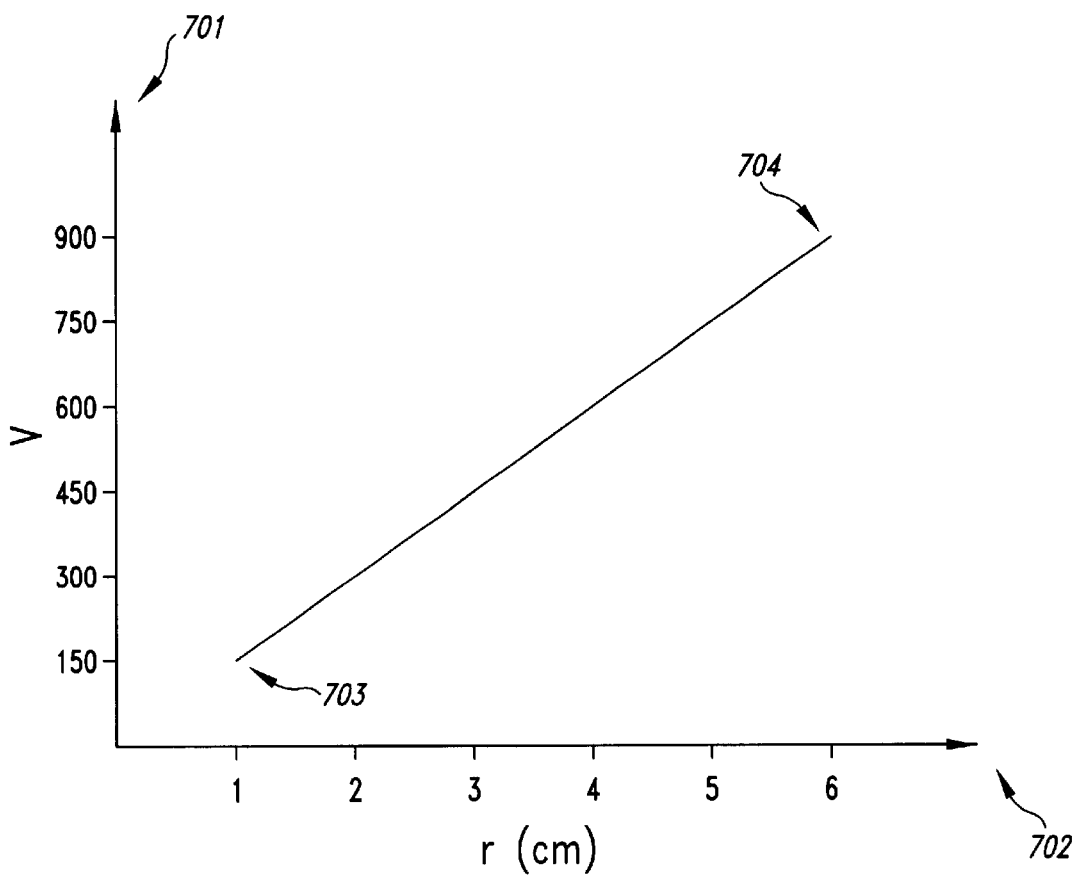
FIG. 7 displays a graph of the data transfer rate versus the radius at which the data is stored for a CAV CD-ROM drive.

FIG. 7 displays a graph of the data transfer rate versus the radius at which the data is stored for a CAV CD-ROM drive. The vertical axis 701 represents the data transfer rate in kilobytes per second and the horizontal axis 702 represents the radius of the data. The numerical values are shown for a standard 150 KB/sec data transfer rate, but the displayed relationship between data transfer rate and radius will have the same form for any multiple of the standard data transfer rate. As can be seen in FIG. 7, the data transfer rate increases linearly with increasing radius of the location of the data, starting at a rate of 150 KB per second at a radius of 1 cm 703 and increasing to a data transfer rate of 900 KB per second at a radius of 6 cm 704.

Figure 8:
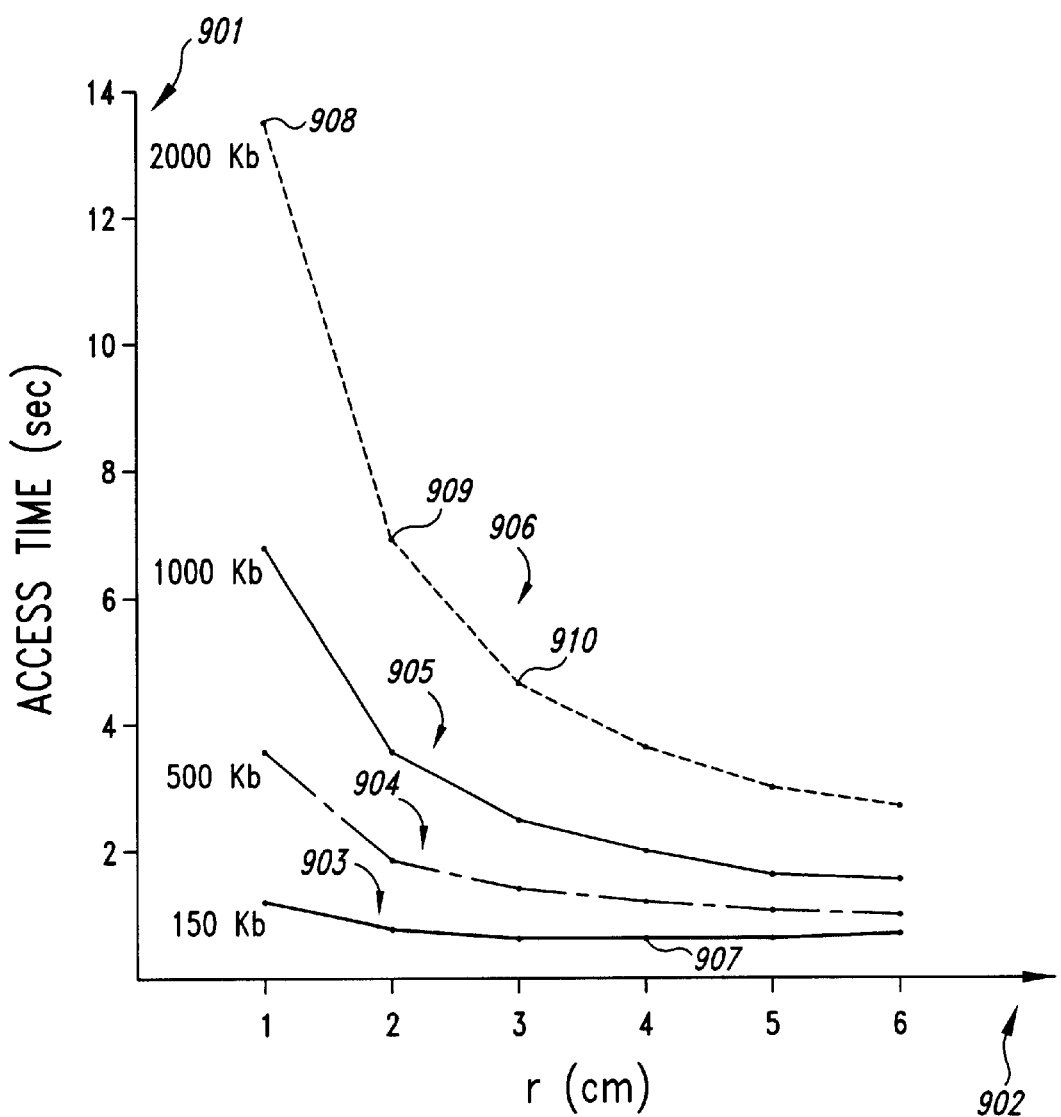
FIG. 8 displays a graph of the seek time versus radial distance for a CD-ROM disk.

As with a CLV drive, the seek time for a CAV drive increases with an increase in the radius at which a file is stored. In the following discussion, the seek time is assumed to vary linearly with respect to radial distance. FIG. 8 displays a graph of the seek time versus radial distance for a CD-ROM disk under this assumption. The vertical axis 801 in FIG. 8 represents the seek time in seconds and the horizontal axis 802 represents the radius at which the file to be accessed occurs on the CD-ROM. As can be seen in FIG. 8, it is assumed in the following discussion that the seek time varies from 150 milliseconds at 1 cm 803 to 450 milliseconds at 6 cm 804.

Figure 9:
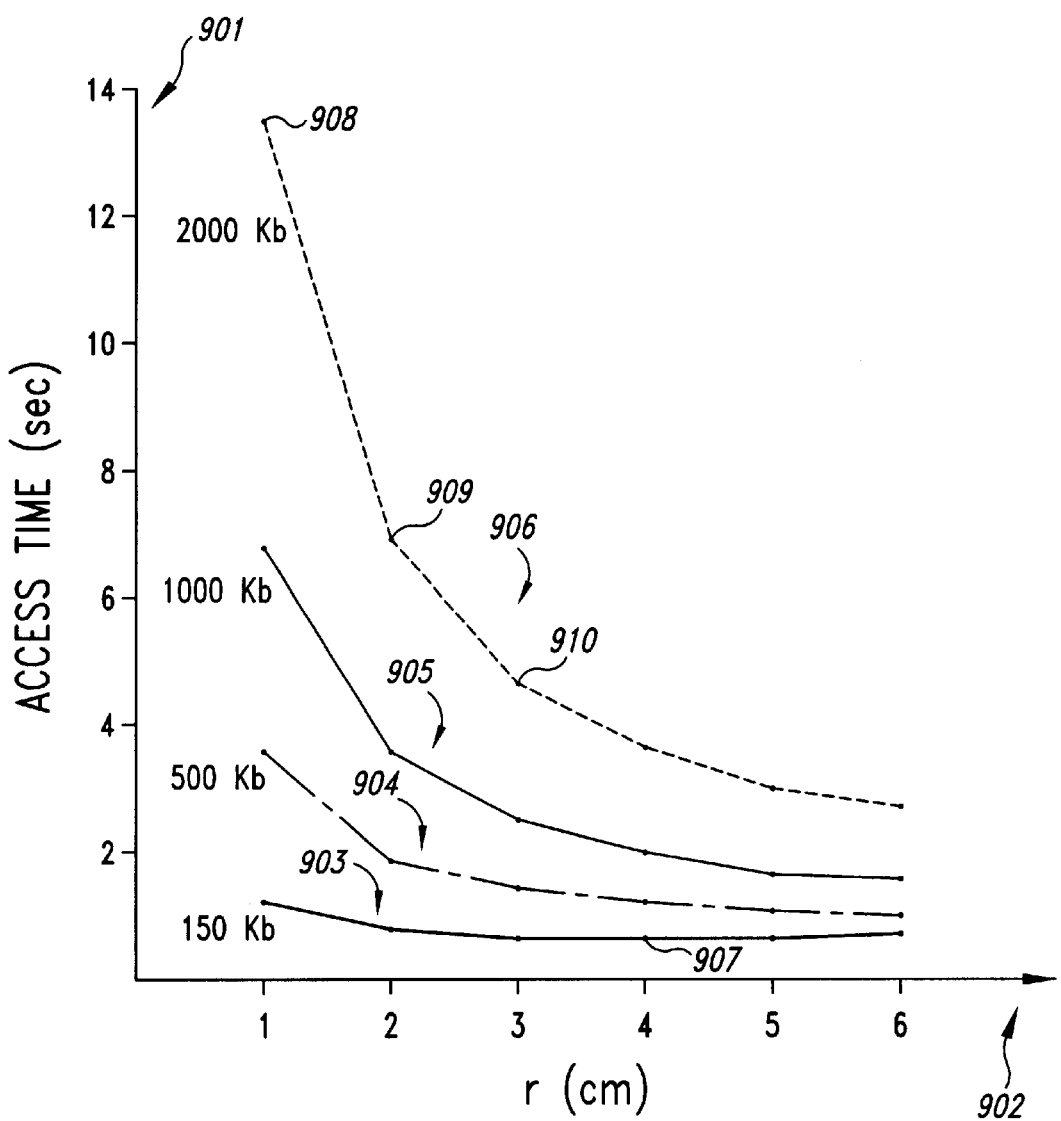
FIG. 9 displays the access time for a file as a function of radius at which the file is stored for files of various lengths.

The graph of seek time displayed in FIG. 8 and the graph of data transfer rates displayed in FIG. 7 can be combined to produce a graph of access time of data versus the radius at which the data to be accessed is located. FIG. 9 displays the access time for a file as a function of radius at which the file is stored for files of various lengths. The vertical axis 901 in FIG. 9 represents the access time in seconds. The horizontal axis 902 in FIG. 9 represents the radius at which the file is located on the CD-ROM. Access time versus radius curves are shown for files of length 150 KB 903, 500 KB 904, 1 MB 905, and 2 MB 906.

According to equation (1), above, the access time for a file is a function of the seek time plus the data transfer time. For small files with correspondingly small data transfer times, the seek time dominates in the calculation of the access time. As the data transfer rate becomes increasingly significant with increasing file length, it is the data transfer rate rather than the seek time that dominates in the calculation of access times. Thus, the access time varies both with the radius at which the data is positioned, as well as with the length of the file to be read. For the 150 KB 903 file in FIG. 9, the access time actually reaches a minimum 907 when the file is positioned at a radius of 4 cm. Below that radius the access time is greater because of the decrease in the data transfer time at smaller radii. Above a radius of 4 cm, the increase in access time with increasing radius of the file more than offsets the decrease in data transfer rate with increasing radius, and thus the access time increases from 4 cm outward to the edge of the disk. The access times for a 500 KB file decrease all the way from the innermost tracks of the disk outward to the outer edge of the disk. However, as can be seen in FIG. 9, the relative decrease in access times is greatest as the file is moved outward for the first few centimeters of the disk. For a 1 MB file, the relative decrease in access time as a file is moved outward from the center of the disk is even more pronounced. For a 2 MB file, as can be seen in FIG. 9, the access time for the file decreases almost by one half when the file is moved from a radius of 1 cm to 2 cm, 908 to 909, and decreases by a third when the file is moved from a radius of 2 cm to 3 cm, 909 to 910. Therefore, as can be seen in FIG. 9, the access times for larger files are smallest at the outer edge of the CD-ROM and greatest in the inner portions of the CD-ROM.

Thus, it turns out that the basic formatting paradigm for CD-ROM disks that was adopted for the slower CLV drives is, in general, opposite from a format that would optimize performance for a CAV drive. In a CLV drive, access times are linearly proportional to the radius at which data is placed on the CD-ROM. Access times are lowest for data placed at the innermost portions of the CD-ROM and longest for data placed at the outer edge of the CD-ROM. For CLV drives, performance can be generally optimized by writing data from the innermost part of the CD drive outward and leaving any unfilled capacity of the CD-ROM as a band at the outer edge of the disk. For CAV drives, however, access times for files larger than some threshold size actually decrease with increasing radius. This is true even in the CD-ROM drives that use a combination of CLV and CAV. In such combined drives, access times will generally increase with increasing radius up to a certain point and then decrease with increasing radius for files greater than a certain threshold size.

Figure 10:
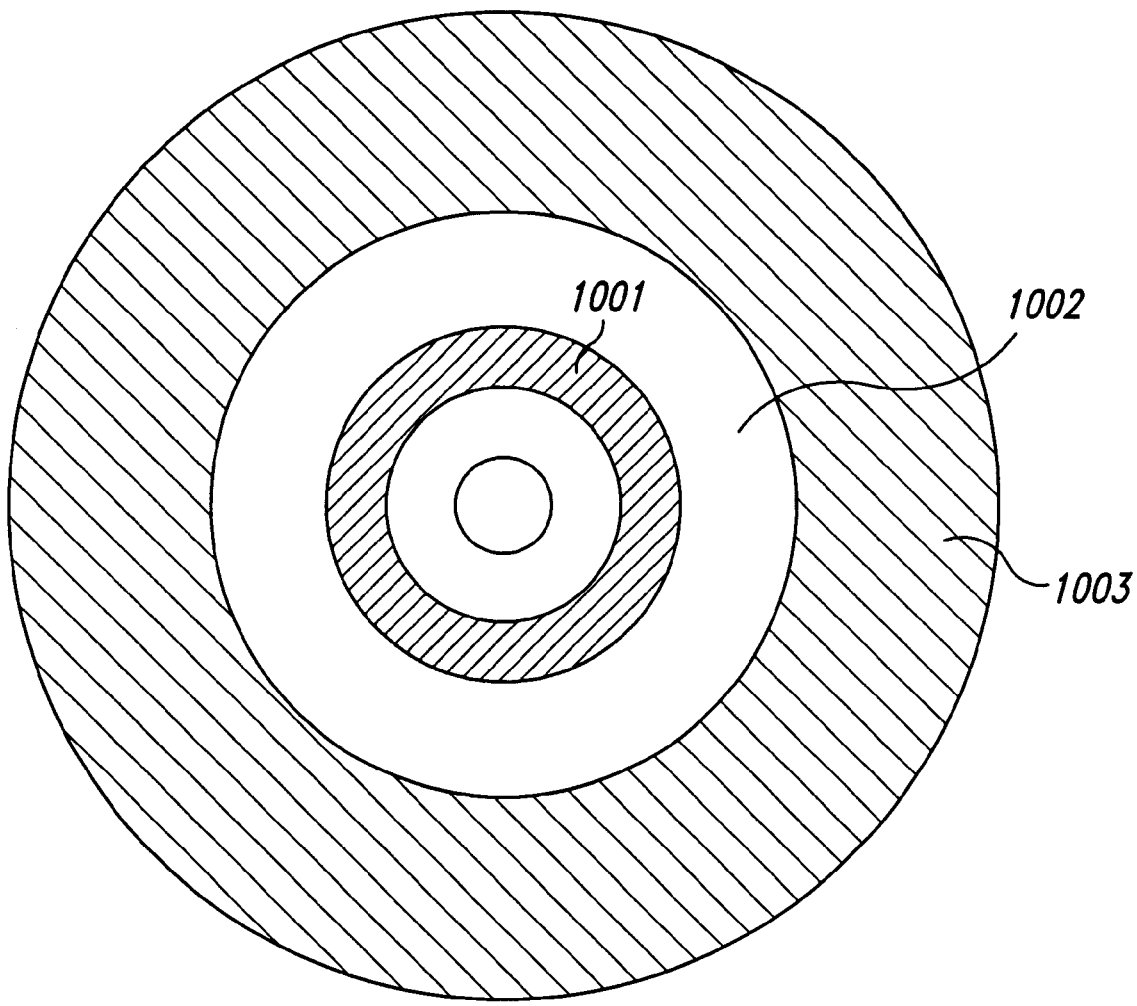
FIG. 10 displays a schematic diagram representing a first new data organization for CD-ROMs.

One method to increase data retrieval efficiency for CAV and hybrid CLV/CAV drives is to move the data files outward on the CD-ROM surface but leave the label and directory data on the inner tracks of the CD-ROM. FIG. 10 displays a schematic diagram representing this new format. The label and directory data 1001 are written from the starting point of the spiral track of the CD-ROM outward. Any unused space or spare capacity then occurs as a band of spare capacity with larger radius than the label and directory band 1002. Following the spare capacity band is a final band containing the data files 1003. If the directory information stored in the label and directory band 1001 can be used by the CD-ROM drive to directly seek to the data files in the outermost band 1003, then the spare capacity band 1002 may be blank. However, if formatted data sectors are required by the CD-ROM drive and the spare capacity band in order to facilitate seeking from the directory information to the data files, then the spare capacity band may be written to contain empty data sectors, or, in other words, may be padded with blank data. This method is easy to implement because the label and directory information occur in the same location of the CD-ROM as that in which they occur under the currently-used formatting convention. Because the directory information contains pointers to the actual data files, this method does not represent a change of the current formatting convention, but simply involves writing the data files to different, higher-radius locations.

Figure 11:
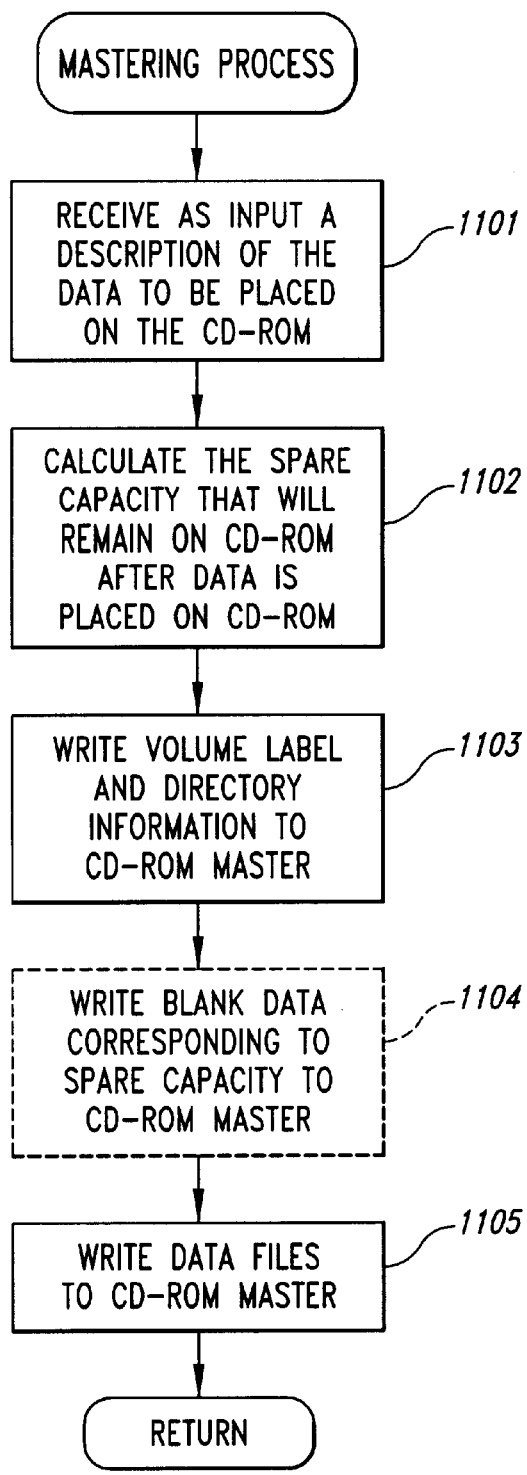
FIG. 11 displays a flow control diagram for a mastering process.

FIG. 11 displays a flow control diagram for the process used to create a master CD-ROM formatted according to this new formatting method. Master CD-ROMs are used as templates for mass production of CD-ROMs identical to the master CD-ROM. In step 1101, a description of the data to be placed on the master CD-ROM is received by the mastering process. This description includes the volume label information, the data files, and the directory structure within which the data files will be organized on the master CD-ROM. In step 1102, the mastering process calculates the spare capacity that will remain on the master CD-ROM after all of the data is placed on the CD-ROM. This calculation involves computing the total size of the data and subtracting the computed total size of the data from the maximum capacity of the CD-ROM master. In step 1103, the mastering process writes volume label and directory information to the CD-ROM master, starting from the inner-most portion of the spiral track in an outward direction. In optional step 1104, the mastering process writes blank data to the CD-ROM master following the volume label and directory information. Finally, in step 1105, the mastering process writes the data files to the CD-ROM.

Figure 12:
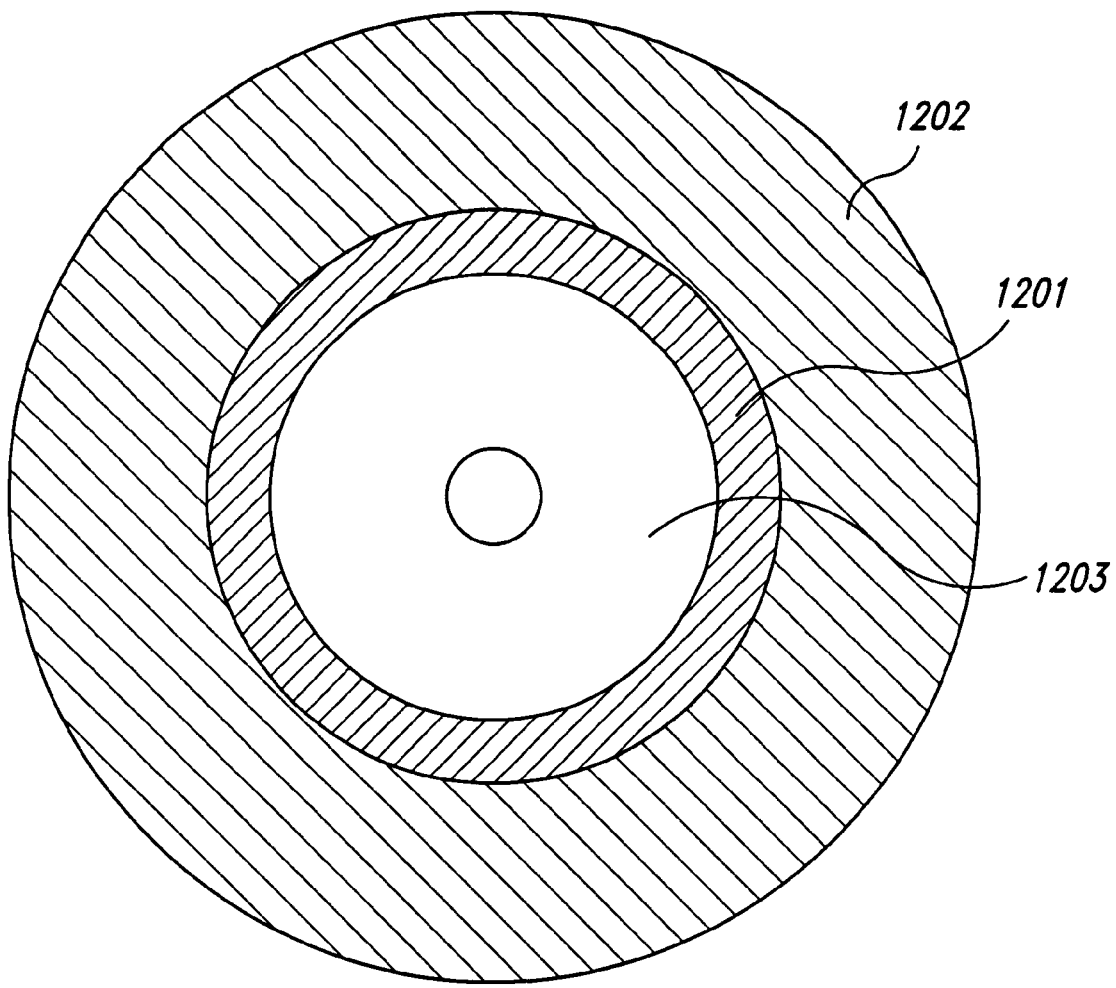
FIG. 12 displays a schematic diagram representing a second new data organization for CD-ROMs.

FIG. 12 displays another method for increasing the data retrieval rate of CD-ROMs read by CAV or hybrid CLV/CAV CD-ROM drives. In this second method, both the label and directory information 1201, as well as the data files 1202, are written to the outer portions of the CD-ROM, with any spare capacity 1203 inhabiting the inner tracks of the CD-ROM. This method, like the previous method, exploits the smaller access times at larger radii that are characteristic to CAV and hybrid CLV/CAV CD-ROM drives. Depending on the controllers and mechanical subsystems of the CD-ROM drive, this method may represent a slight change in the standard CD-ROM format. In particular, the label and directory information is now located at a different position on the CD-ROM than under the previous formatting standard. This method may have the advantage of locating frequently-accessed directory information close to the radius on the CD-ROM offering best retrieval performance for smaller files. For instance, in the example data displayed in the graph of FIG. 9, best access times for 150 KB sized files occur at a radius of 4 cm.

Figure 13:
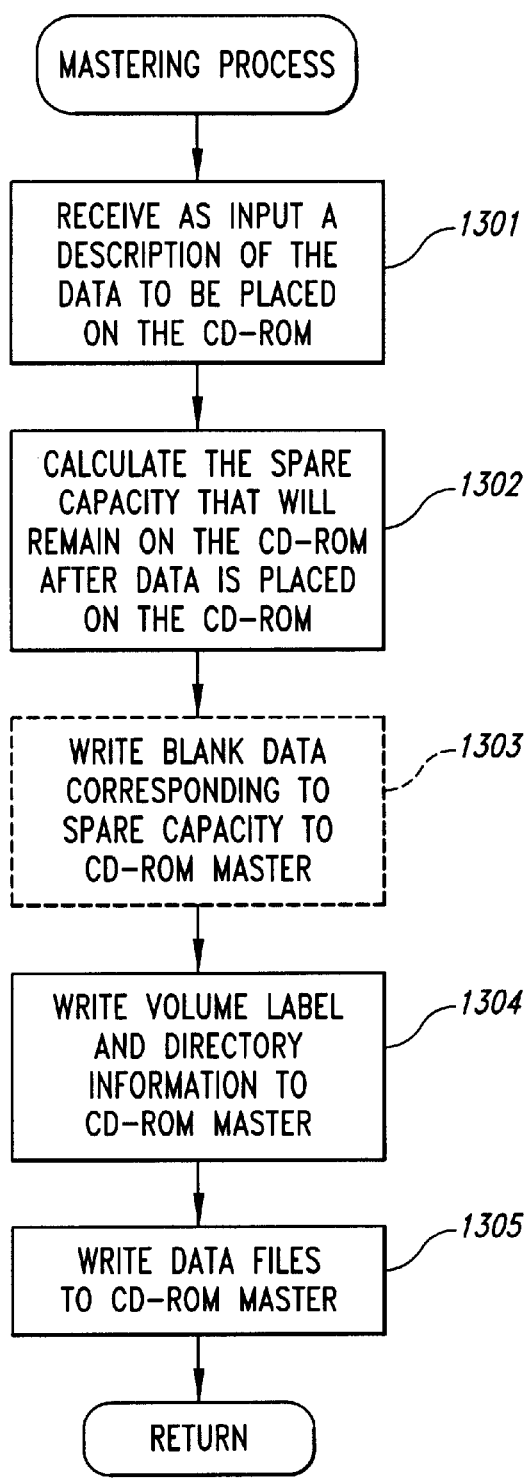
FIG. 13 displays a flow control diagram for a mastering process.

FIG. 13 displays a flow control diagram for the process used to create a master CD-ROM formatted according to this second new formatting method. In step 1301, a description of the data to be placed on the master CD-ROM is received by the mastering process. This description includes the volume label information, the data files, and the directory structure within which the data files will be organized on the master CD-ROM. In step 1302, the mastering process calculates the spare capacity that will remain on the master CD-ROM after all of the data is placed on the CD-ROM. This calculation involves computing the total size of the data and subtracting the computed total size of the data from the maximum capacity of the CD-ROM master. In optional step 1303, the mastering process writes blank data to the CD-ROM master starting from the inner-most portion of the spiral track in an outward direction. In step 1304, the mastering process writes volume label and directory information to the CD-ROM master following the volume label and directory information. Finally, in step 1305, the mastering process writes the data files to the CD-ROM.

Although the present invention has been described in terms of two embodiments, it is not intended that the invention be limited to these two embodiments. Modifications within the spirit of the invention will be apparent to those skilled in the art. For example, further optimizations may be available for writing a collection of data files. Since the increase in file retrieval times with decreasing radius is most pronounced for larger files, the data files might be ordered with increasing size within the data file bands 1003 and 1102 of FIGS. 10 and 11, respectively. The scope of the present invention is defined by the claims that follow.

What is claimed is:

1. A method for organizing data stored on a CD-ROM having a center and an outer edge, the data stored sequentially on the CD-ROM along a track that spirals from near the center of the CD-ROM to the outer edge of the CD-ROM, the data comprising volume label data, directory data, and file data, the method comprising:

storing the volume label data and the directory data on the CD-ROM along the track near the center of the CD-ROM; and storing files of file data on the CD-ROM along the track positioned justified to the outer edge of the CD-ROM wherein larger files of file data are stored closer to the outer edge than smaller files of file data.

2. The method of claim 1 further comprising storing blank data along the track starting at a position on the track following the volume label and directory data and preceding the file data.

3. The method of claim 1 wherein the CD-ROM is readable by a CD-ROM drive that operates at a constant angular velocity.

4. The method of claim 1 wherein the CD-ROM is readable by a CD-ROM drive that operates at a constant angular velocity when reading data from one part of the track and that operates at a constant linear velocity when reading data from the other part of the track.

5. A method for organizing data stored on a CD-ROM having a center and an outer edge, the data stored sequentially on the CD-ROM along a track that spirals from near the center of the CD-ROM toward the outer edge of the CD-ROM, the data comprising a number of units of volume label data, directory data, and file data, the method comprising:

storing the file data on the CD-ROM along the spiral track so that the file data ends at a position adjacent to the outer edge; and storing the volume label data and directory data on the CD-ROM along the track so that the volume label data and directory data ends at a position adjacent to the start of the file data.

6. The method of claim 5 further comprising storing blank data along the track starting near the center of the CD-ROM and ending near the start of the volume label data and directory data.

7. The method of claim 5 wherein the CD-ROM is readable by a CD-ROM drive that operates at a constant angular velocity.

8. The method of claim 5 wherein the CD-ROM is readable by a CD-ROM drive that operates at a constant angular velocity when reading data from one part of the track and that operates at a constant linear velocity when reading data from the other part of the track.

9. A method for increasing data retrieval rates from a data storage device that retrieves data from a data storage medium rotating at constant angular velocity, the data storage medium having a center and an outer edge, the method comprising placing the data on the data storage medium so that the data forms an outer band on the surface of the data storage medium justified to the outer edge; wherein larger files of file data are stored closer to the outer edge than smaller files of file data.

10. The method of claim 9 wherein the data comprises file data and non-file data, the method further comprising placing the non-file data in an inner band justified to the center of the data storage medium and placing the file data on the data storage medium so that the file data forms the outer band on the surface of the data storage medium.

11. The method of claim 9 wherein the data storage medium rotates at a constant angular velocity when retrieving data near the outer edge and rotates at a constant linear velocity when retrieving data near the inner edge.

12. The method of claim 9 wherein the data storage medium is an optical storage medium.

13. The method of claim 9 wherein the data storage medium is a CD-ROM.

14. A system for placing data on a CD-ROM, the CD-ROM having a center and an outer edge, the data stored sequentially on the CD-ROM along a track spiraling from near the center of the CD-ROM toward the outer edge of the CD-ROM, the data comprising file data and non-file data, the system comprising:

a non-file data placing component that places the non-file data on the CD-ROM along the track near the center of the CD-ROM; and a file data placing component that places files of the file data on the CD-ROM along the track so that the end of the non-file data is justified toward the outer edge wherein larger files of file data are stored closer to the outer edge than smaller files of file data.

15. The system of claim 14 including a CD-ROM that rotates the CD-ROM at a constant angular velocity.

16. The system of claim 14 including a CD-ROM drive that selectively rotates the CD-ROM drive at a constant angular velocity and a constant linear velocity.

17. A system for placing data on a CD-ROM, the CD-ROM having a center and an outer edge, the data stored sequentially on the CD-ROM along a track spiraling from near the center of the CD-ROM toward the outer edge of the CD-ROM, the data comprising file data and non-file data, the system comprising:

a file data placing component that places files of the file data on the CD-ROM along the track starting at a position on the track so that the file data is justified toward the outer edge wherein larger files of file data are stored closer to the outer edge than smaller files of file data; and a non-file data placing component that places the non-file data on the CD-ROM along the track so that the end of the non-file data is justified toward the start of the file data.

18. The system of claim 17 including a CD-ROM that rotates the CD-ROM at a constant angular velocity.

19. The system of claim 17 including a CD-ROM drive that selectively rotates the CD-ROM drive at a constant angular velocity and at constant linear velocity.

20. A computer-readable data storage medium containing data, the data storage medium having a center and an outer edge, the data being stored sequentially on the data storage medium, the data comprising non-file data and file data, the non-file data stored so that the non-file data is justified to the center of the data storage medium and the file data stored so that the end of the file data is justified to the outer edge of the data storage medium wherein larger files of file data are stored closer to the outer edge than smaller files of file data.

21. The computer-readable medium of claim 20 wherein the non-file data include volume label data and directory data.

22. The computer-readable data storage medium of claim 20 wherein the data storage medium is a CD-ROM.

23. A computer system comprising:

a central processing unit;

memory;

a CD-ROM drive that rotates a CD-ROM containing file data at constant angular velocity while reading some portion of the CD-ROM; and a CD-ROM having a center, an outer edge, and a data storage track that spirals from near the center of the CD-ROM toward the outer edge of the CD-ROM, files of the file data justified within the data storage track toward the outer edge of the CD-ROM wherein larger files of file data are stored closer to the outer edge than smaller files of file data.

24. The computer system of claim 23 wherein the CD-ROM contains both file data and non-file data and wherein the non-file data is justified within the data storage track toward the center of the CD-ROM and the file data is justified within the data storage track toward the outer edge of the CD-ROM.

25. The computer system of claim 23 wherein the file data is comprised of a first file data and a second file data, and the first file data has a file size larger than the second file data, the first file data being positioned closer to the outer edge of the CD-ROM than the second file data.

* * * * *

UNITED STATES PATENT AND TRADEMARK OFFICE
CERTIFICATE OF CORRECTION

| | |
|---|---|
| PATENT NO. | : 6,215,747 B1 |
| DATED | : April 10, 2001 |
| INVENTOR(S) | : Jeffrey R. Jobs |

It is certified that error appears in the above-identified patent and that said Letters Patent is hereby corrected as shown below:

<u>Column 8,</u>
Line 45, after "edge", please add the following -- wherein larger files of the file data are stored closer to the outer edge than smaller files of that file data --.

Signed and Sealed this

Thirtieth Day of April, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,215,747 B1
DATED         : April 10, 2001
INVENTOR(S)   : Jeffrey R. Jobs It is certified that error appears in the above-identified patent and that said Letters Patent is hereby corrected as shown below:

<u>Column 8,</u>
Line 45, after "edge", please add the following -- wherein larger files of the file data are stored closer to the outer edge than smaller files of the file data --.

This certificate supersedes Certificate of Correction issued April 30, 2002

Signed and Sealed this

Twenty-fourth Day of December, 2002

JAMES E. ROGAN
*Director of the United States Patent and Trademark Office*